(12) United States Patent
Koivuniemi et al.

(10) Patent No.: US 9,473,482 B2
(45) Date of Patent: Oct. 18, 2016

(54) PUSH-BASED TRUST MODEL FOR PUBLIC CLOUD APPLICATIONS

(71) Applicant: Nokia Corporation, Espoo (FI)

(72) Inventors: Samuli J. Koivuniemi, Woburn, MA (US); Zahid N. Ahmed, Westborough, MA (US); Sumit Lonial, Bedford, MA (US); Mike Beauford, Morton Grove, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/571,761

(22) Filed: Dec. 16, 2014

(65) Prior Publication Data

US 2015/0180848 A1    Jun. 25, 2015

Related U.S. Application Data

(60) Provisional application No. 61/919,164, filed on Dec. 20, 2013.

(51) Int. Cl.
*H04L 29/06* (2006.01)

(52) U.S. Cl.
CPC ............. *H04L 63/08* (2013.01); *H04L 63/062* (2013.01); *H04L 63/0823* (2013.01)

(58) Field of Classification Search
CPC ............................ H04L 63/08; H04L 63/062
USPC .......................................................... 726/4
See application file for complete search history.

(56) References Cited

U.S. PATENT DOCUMENTS

| | | |
|---|---|---|
| 7,207,039 B2 | 4/2007 | Komarla et al. |
| 8,291,480 B2 | 10/2012 | de Cesare |
| 8,312,518 B1 | 11/2012 | Ezell et al. |
| 8,533,796 B1 | 9/2013 | Shenoy et al. |
| 8,694,777 B2 | 4/2014 | Goodman et al. |
| 8,826,013 B1 | 9/2014 | Kodukula et al. |
| 9,065,832 B2 * | 6/2015 | Barzily ............... H04L 67/1002 |
| 9,152,784 B2 * | 10/2015 | Das .......................... G06F 21/51 |
| 2005/0210254 A1 | 9/2005 | Gabryjelski et al. ......... 713/175 |
| 2007/0234041 A1 | 10/2007 | Lakshmeshwar |
| 2010/0198730 A1 | 8/2010 | Ahmed et al. |
| 2010/0266132 A1 | 10/2010 | Bablani |
| 2011/0289315 A1 | 11/2011 | Laitinen |
| 2011/0302400 A1 | 12/2011 | Maino et al. |
| 2011/0307947 A1 | 12/2011 | Kariv et al. |

(Continued)

FOREIGN PATENT DOCUMENTS

| | | |
|---|---|---|
| GB | 2489563 A | 10/2012 |
| WO | WO 2014/091082 A1 | 6/2014 |

OTHER PUBLICATIONS

"AWS Security Token Service Using Temporary Security Credentials API Version Jun. 15, 2011"; 2011; pp. 1-59.

(Continued)

*Primary Examiner* — Longbit Chai
(74) *Attorney, Agent, or Firm* — Harrington & Smith

(57) ABSTRACT

In accordance with the exemplary embodiments of the invention there is at least a method and apparatus to perform operations including deploying, with a device of a private network, an application instance with an application web service in a cloud network; and based on the deploying, communicating with the application web service in the cloud network to establish a trust relationship with the application web service for the application instance.

19 Claims, 8 Drawing Sheets

(56) References Cited

U.S. PATENT DOCUMENTS

| | | |
|---|---|---|
| 2011/0320802 A1 | 12/2011 | Wang |
| 2012/0088584 A1 | 4/2012 | Mamtani et al. |
| 2012/0151568 A1 | 6/2012 | Pieczul |
| 2012/0179904 A1 | 7/2012 | Dunn et al. ............... 713/155 |
| 2012/0185913 A1 | 7/2012 | Martinez et al. ............ 726/1 |
| 2012/0216244 A1 | 8/2012 | Kumar et al. |
| 2012/0240211 A1 | 9/2012 | Counterman |
| 2012/0254443 A1 | 10/2012 | Ueda ........................ 709/226 |
| 2012/0265976 A1 | 10/2012 | Spiers et al. ............... 713/2 |
| 2012/0266231 A1 | 10/2012 | Spiers |
| 2012/0324556 A1 | 12/2012 | Yefimov et al. |
| 2013/0007845 A1 | 1/2013 | Chang et al. ............... 726/4 |
| 2013/0086210 A1 | 4/2013 | Yiu et al. |
| 2013/0117564 A1 | 5/2013 | Chang et al. |
| 2013/0139235 A1 | 5/2013 | Counterman |
| 2013/0149996 A1 | 6/2013 | King |
| 2014/0019753 A1 | 1/2014 | Lowry |
| 2014/0040993 A1 | 2/2014 | Lorenzo et al. |
| 2014/0050317 A1 | 2/2014 | Sabin |
| 2014/0082715 A1 | 3/2014 | Grajek et al. |
| 2014/0105103 A1 | 4/2014 | Nethi et al. |
| 2014/0359259 A1 | 12/2014 | Ali et al. |
| 2015/0128121 A1* | 5/2015 | Garcia .................. G06F 8/65 717/170 |
| 2015/0163669 A1 | 6/2015 | Holtmanns |

OTHER PUBLICATIONS

Nokia Technologies Oy, AWS Security Token Service Using Temporary Security Credentials, API Version Jun. 15, 2011, Datasheet. Amazon Web Services, (2015), (106 pages).

* cited by examiner

PUSH-BASED TRUST MODEL FOR PUBLIC CLOUD APPLICATIONS

CROSS-REFERENCE TO RELATED APPLICATIONS

This patent application claims priority under 35 U.S.C. §119(e) from U.S. Provisional Patent Application No. 61/919,164, filed Dec. 20, 2013, the disclosure of which is incorporated by reference herein in its entirety.

TECHNICAL FIELD

The teachings in accordance with the exemplary embodiments of this invention relate generally to cloud centric application trust validation and, more specifically, relate to a solution to deploy sensitive applications to a public cloud by utilizing a model where master keys are reliably pushed to the cloud from a trusted zone such as within a corporate network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AES advanced encryption standard
AMI amazon machine image
API application programing interface
AWS Amazon Web Services
DB database
DC domain controller
DEK data encryption key
EBS (Amazon) elastic block store
ELB (Amazon) elastic load balancer
EMR (Amazon) elastic map reduce
FIPS federal information processing standards
HSM hardware security module
ID identification
JVM java virtual memory
KEK key encryption key
KM key management
KMS key management service
PII personally identifiable information
RDS relational database service
SDK software development kit
SSH secure shell
SSL secure sockets layer
VM virtual memory Cloud computing is an approach to sharing computing resources over the Internet. One area of cloud computing includes a host provider (for example, cloud provider) providing virtual server instances on which devices can run applications. Public Cloud Applications often need to secure sensitive information such as data encryption keys or user/system credentials. Main challenges in securing such information are to deliver 'master keys' to cloud applications and to establish trust to instances and applications running in public cloud environment. Examples of applications available in such a cloud environment can include social media applications, and applications provided by Yahoo®, EBay®, and Amazon® to name only a few. As these applications are run in a cloud separate from a private cloud device and its application service provider special attention needs to be given to application data security. In this regard at least a problem exists in that application data security may not be trusted to be provided by the cloud provider. This invention presents solutions to at least the above described problems.

SUMMARY

In an exemplary aspect of the invention, there is a method comprising: deploying, with a device of a private network, an application instance with an application web service in a cloud network; and based on the deploying, communicating with the application web service in the cloud network to establish a trust relationship with the application web service for the application instance.

In another exemplary aspect of the invention, there is an apparatus comprising: at least one processor, and at least one memory including computer program code, where the at least one memory and the computer program code are configured, with the at least one processor, to cause the apparatus to at least: deploy, with a device of a private network, an application instance with an application web service in a cloud network; and based on the deploying, communicate with the application web service in the cloud network to establish a trust relationship with the application web service for the application instance.

In another exemplary aspect of the invention, there is an apparatus comprising: means for deploying, with a device of a private network, an application instance with an application web service in a cloud network; and means, based on the deploying, for communicating with the application web service in the cloud network to establish a trust relationship with the application web service for the application instance.

In accordance with the exemplary embodiments as described in the paragraph above, the means for deploying and the means for communicating comprises an interface to a communication network, and a computer readable medium including computer program code, the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of the invention provide at least a method to provide cloud centric trust validation including deploying sensitive applications to a public cloud by utilizing a model and pushing master keys to the cloud from a trusted zone such as within a corporate network.

Current state of technology depends on encryption operations and key management systems deployed within public cloud environments and/or leveraging trust validation solution that exclusively or significantly depend on validation of applications from within the public cloud. Both of these factors will pose various security and compliance risks to users and other entities.

Establishing trust between cloud applications and corporate network is usually done using 'pull' mechanism, where cloud application connects to a corporate network and identifies itself with specific authentication information such as SSH keys or other credentials. The challenge in this kind of model is how to deliver that authentication information to cloud applications in the first place. Previous solutions have not been very secure (because of a chicken-and-egg type of situation) or they've been very dependent on specific cloud provider security controls. The exemplary embodiments of the invention provide at least a method and apparatus to 'push' master keys generated for a private network, such as a corporate network, for establishing a most secure trust between the cloud applications and the corporate network.

Figure 1:
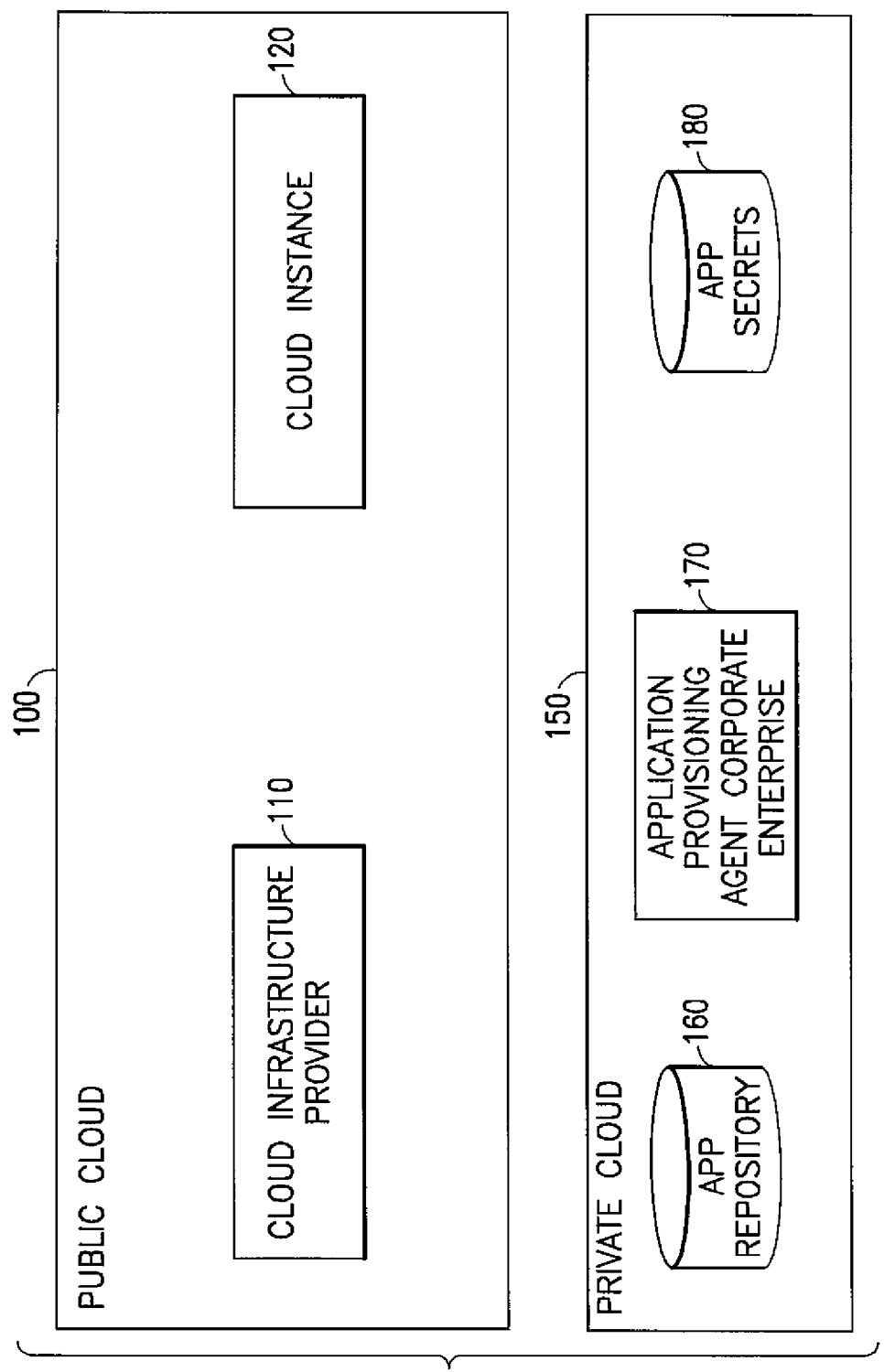
FIG. 1 illustrates a general overview of components and entities which the exemplary embodiments of the invention can benefit.

FIG. 1 illustrates a general overview of components and entities which the exemplary embodiments of the invention can benefit. As illustrated in FIG. 1 there is a public cloud 100. There is illustrated within the public cloud 100 a cloud infrastructure provider 110 and a cloud instance 120. The cloud instance 120 can be representative of an application instance as will be discussed in more detail herein. In addition, in FIG. 1 there is a private cloud 150. There is illustrated within the private cloud 150 an application provisioning agent corporate enterprise 170, an application repository 160, and an application secrets repository 180. The exemplary embodiments of the invention enable secure application instance deployment in a public cloud by an application provisioning agent of a private network such as in the private cloud 150. The exemplary embodiments of the invention enable a private entity to utilize the public cloud to deploy applications in a public cloud safely using approach where the use of the application instances and the security elements of the connection are made much more secure for a device using the application in the public cloud. The exemplary embodiments further enable at least an establishment of a master key which is created and/or selected by the private network for the use and authentication of the application.

This invention presents a model where only non-sensitive information is required to be stored to cloud and using that, public and non-sensitive information, corporate network can safely and securely deploy new applications by pushing the required master keys to new cloud instances. Exemplary embodiments of the invention are described in at least FIGS. 3A and 3B.

Although the invention may be described and/or illustrated using references to particular entities such as Nokia® and Amazon® the use of these entities is non-limiting and the invention can be practiced to the benefit of any entities which incorporate similar technology.

In accordance with an exemplary embodiment of the invention which will be described in more detail below there is at least a method to deploy sensitive applications to a public cloud by utilizing a model where master keys are pushed to the cloud from a trusted zone such as within a corporate network.

Figure 2:
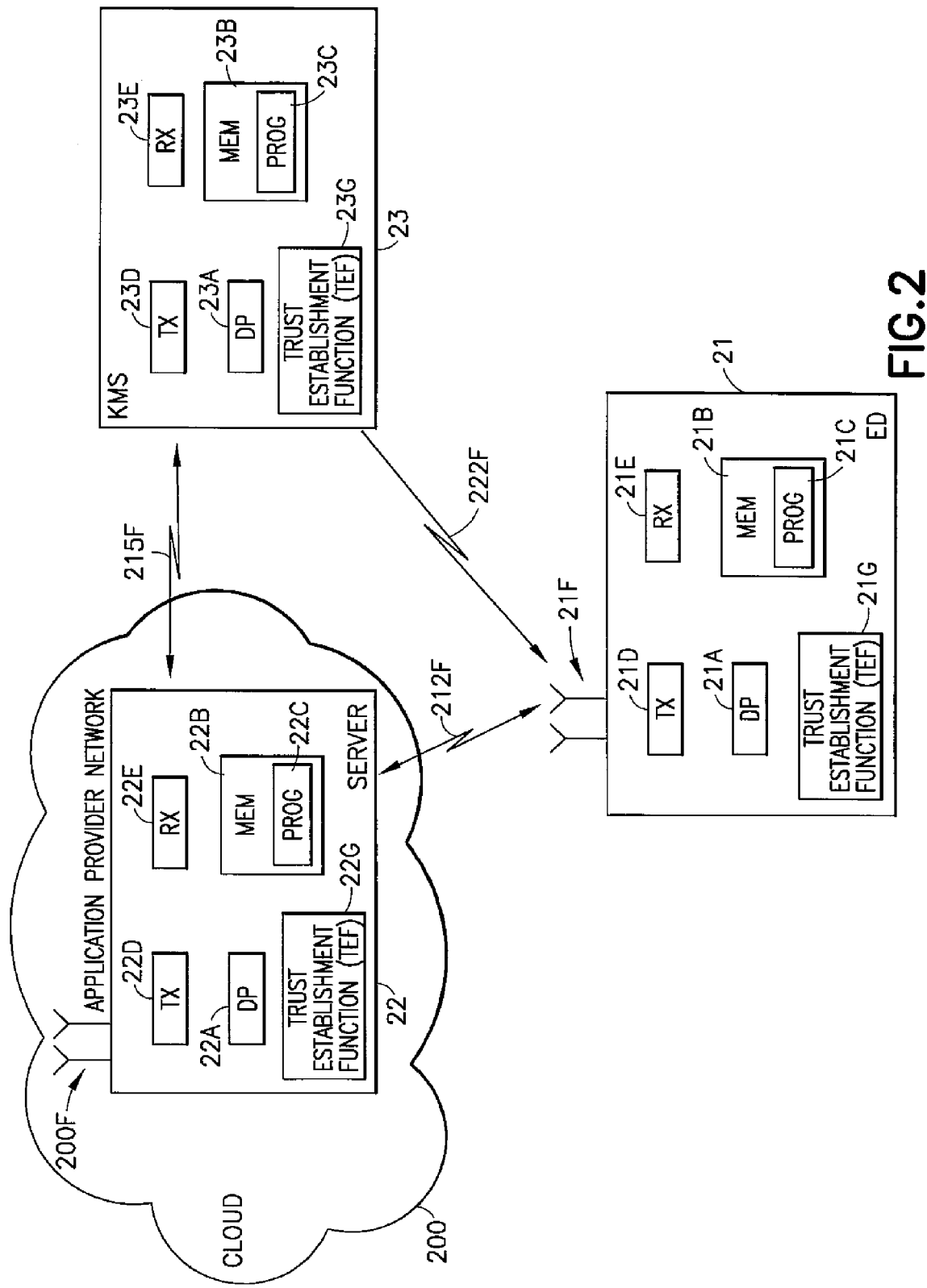
FIG. 2 shows a simplified block diagram of various electronic devices that are suitable for use in practicing the exemplary embodiments of this invention.

Before describing in further detail the exemplary embodiments of this invention reference is made to FIG. 2 for illustrating a simplified block diagram of various electronic devices and apparatus that are suitable for use in practicing the exemplary embodiments of this invention.

The server 22 of FIG. 2 can be associated with a public cloud 200. The server 22 includes a controller, such as at least one computer or a data processor (DP) 22A, at least one computer-readable memory medium embodied as a memory (MEM) 22B that stores a program of computer instructions (PROG) 22C, and at least one suitable RF transceiver 22D for communication with the ED 21 via antennas 21F (several when MIMO operation is in use). The server 22 is coupled via a data/control path 212F to the ED 21. The path 212F may be implemented such as by a wired and/or wireless connection. The server 22 can also be coupled to another device, such as via the data/control path 215F to the KMS 23.

The ED 21 includes a controller, such as at least one computer or a data processor (DP) 21A, at least one non-transitory computer-readable memory medium embodied as a memory (MEM) 21B that stores a program of computer instructions (PROG) 21C, and at least one suitable radio frequency (RF) transmitter and receiver pair (transceiver) 21D for bidirectional wireless communications with the key management system 23, the application server 22, and/or another device associated with the cloud via an antenna or antennas 21F, and/or a hardwired connection. In addition the KMS 23 may be directly or indirectly connected to the ED 21 such as via a connection 222F.

For the purposes of describing the exemplary embodiments of this invention the application server 22, the application provider device 21, and/or the key management system 23 may be assumed to include a trust establishmnent function (TEF). The TEF 21G, TEF 22G, and/or the TEF 23G are assumed to be configured to operate in accordance with the non-limiting examples of the embodiments of this invention as described herein.

At least one of the programs 21C, 22C, and 23C is assumed to include program instructions that, when executed by the associated data processor, enable the device to operate in accordance with the exemplary embodiments of this invention, as will be discussed below in greater detail. That is, the exemplary embodiments of this invention may be implemented at least in part by computer software executable by the DP 21A, DP 22A, and/or DP 23A, or by hardware, or by a combination of software and hardware (and/or firmware). Likewise, the TEF 21G, TEF 220, and the TEF 23G may be implemented at least in part by executable computer software, or by hardware, or by a combination of software and hardware (and firmware).

The various data processors, memories, programs, transceivers and interfaces depicted in FIG. 2 may all be considered to represent various means for performing operations and functions that implement the several non-limiting aspects and embodiments of this invention.

In general, the various embodiments of the ED 21 may include, but are not limited to, a server, cellular mobile devices, personal digital assistants (PDAs) having wireless and/or wired communication capabilities, portable computers having communication capabilities, GPS devices, image capture devices such as digital cameras having communication capabilities, gaming devices having communication capabilities, music storage and playback appliances having communication capabilities, Internet appliances permitting wireless Internet access and browsing, as well as portable units or terminals that incorporate combinations of such functions.

The computer-readable memories 21B, 22B, and 23B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 21A, 22A, and 23A may be of any type suitable to the local technical environment, and may include one or more of general purpose computers, special purpose computers, microprocessors, digital signal processors (DSPs) and processors based on multi-core processor architectures, as non-limiting examples.

Application data security in cloud is reliant on application credential and/or key security. Sensitive data associated with an application running in a cloud provider network and/or a public cloud can more easily be compromised. The exemplary embodiments of the invention include a method and apparatus to provide with an application service provider or a third party provider who is separate from the cloud provider, a unique key and/or master key which can be used by an application server and a private cloud device to authenticate an application running in a public cloud. The method in accordance with the exemplary embodiments providing novel authentication means and protection against security threats when running such cloud centric applications, as will be described in more detail below.

Most AWS deployments need to secure some kind of sensitive information: database encryption keys, passwords to mount volumes, user/system credentials in configuration files. However at least for applications that maintain classified or restricted data a master key (KEK) can be provided from an independent and trusted location outside of AWS.

There are many alternatives for providing the master key from a trusted location. Due to increased complexity implementing these alternatives can be quite challenging especially when deployments must be automated. The exemplary embodiments of the invention provide novel different alternatives for providing a master key are described in this application.

Key Provisioning Push Model

Figure 3A:
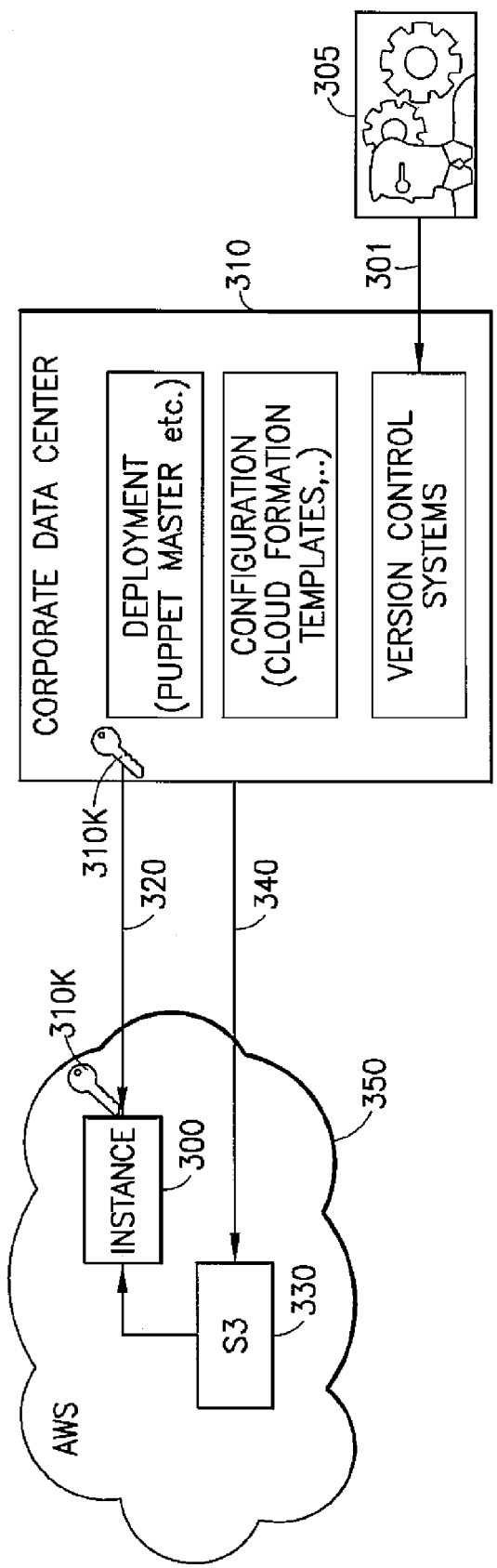
FIGS. 3A and 3B each show features and operations of application deployment associated with a master key push for a cloud application in accordance with exemplary embodiments of the invention.

FIG. 3A illustrates an operation of a cloud application trust validation in accordance with an exemplary embodiment of the invention. With regards to FIG. 3A this figure shows operations in accordance with an exemplary embodiment of the invention related to a key provisioning push model where instances and keys are assigned for use by a device, such as but not limited to the ED 21 as described above. The operations as illustrated in FIG. 3A are described below:

1. Deployment starts. Target: Begin deployment by starting a new instance.
    Administrator 305 associated via a link 301 with a corporate data center 310 starts with signal line 340 the deployment or alternatively a new instance is deployed as a result from auto-scaling rules etc. The link 301 may be a link internal to an enterprise which comprises the corporate data center 310 or may be a remote connection to the corporate data center 310, such as made via the enterprise.

In a non-limiting embodiment, deployment scripts can be based on Cloud Formation, and/or a specific machine image, such as an AMI in S3 or some other mechanism.
    Custom instance of the machine image of the AWS 350 can be stored in S3 330 or instance can be deployed on top of a 'plain' image.
    Initial deployed instance 300 must include specific secrets used to authenticate 'deployment' user such as SSL certificates, API signing keys or user SSH credentials in authorized_keys file.
After this step the instance is running but not yet operational.
2. Trust the instance is established. Target: Deliver secrets from an external source to newly started instance.
    As shown with line 320 the 'deployment' user logs in or authenticates itself to the instance and/or line 212F of FIG. 2) using corresponding secrets from Corporate Data Center such as private SSH keys 310K, SSL certificates or API signing keys. Once logged in or authenticated, secrets are pushed to the newly started instance for example by assigning a number of environment variables containing the secrets or sending secrets over REST API. Secrets can be read from a specific source control location or from other secure location inside the Corporate Data Center.
3. Instance start-up. Target: Clean up deployment and start services. After this step the new instance is operational
    Secrets received in the previous step and saved to web server Java VM's memory only.
        Clean-up in case of SSH user: environment variables are cleared. Now secrets are only present in JVM process' memory. Deployment SSH key from authorized_keys file is removed and deployment user logs off from the instance.
        Clean-up in case of REST API: secrets 'push' REST API (initialize endpoint for example) is shut down and does not accept subsequent requests. Secrets are only present in JVM process' memory.
        Further, deployment machine in Corporate Data Center must maintain a list of provisioned instances to make sure bootstrapping is done only once per instance. Provisioned instances are identified by cloud provider specific means, such as instance ID in case of Amazon Web Services.

Figure 3B:
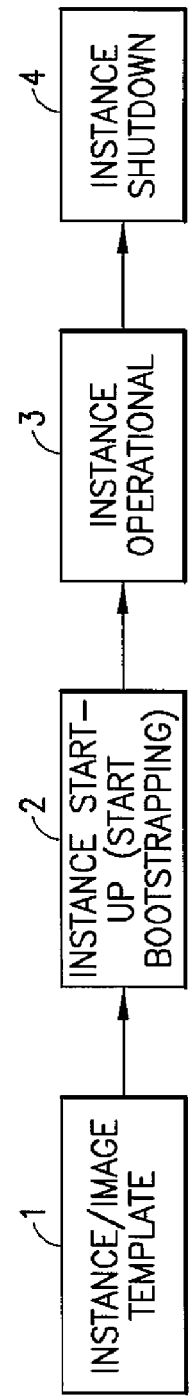

FIG. 3B further illustrates feature blocks of operations which are used to describe, with regards to FIG. 3A, a process description for each of the exemplary operations of 1) an SSH-based trust model establishment and application provisioning in the cloud features blocks, and 2) an API-based trust model establishment and application provisioning in the cloud.

These features blocks of FIG. 3B are described as follows with regards to an SSH-based trust model establishment and application provisioning in the cloud features blocks. In accordance with the exemplary embodiments of the invention as illustrated in FIG. 3B there is at:
    Feature Block 1: Instance/Image Template;
        An SSH public key is pre-configured in the instance image
        An SSH public key is associated with the target App "A"
    Feature Block 2: Instance Start-Up (e.g. Bootstrapping)
        Instance is started and IP Address is assigned.
    Feature Block 3: Instance Operation
        1. Agent may make API calls to cloud infrastructure service provider to look-up InstanceID, verify the instance/domain is allocated to the Cloud Service Account of the organization enterprise; it is noted that the deployment user may be required to be authenticated regarding the target cloud-based instance where the application instance will be deployed and bootstrapped. That target instance may not need an explicit validation per se since the target instance IP Address and instanceID (in the cloud) may be selected and validated by the corporate administrator (as part of the provisioning/deployment process.

2. Authorized "Deployment user" (Agent) associated with App A makes SSH connection to the instance at the IP Address from Step#2.
3. Instance is validated by the Agent as a result of login access.
4. Agent injects the master key from Corporate Data Center to the instance
5. Assign secrets (master key) as environment variables of the instance
6. StarttheAppA
7. App A reads the secret
8. As an example once the Application instance has at run-time access to the master key, the App instance can potentially decrypt other dataset or datastore specific encryption keys to get eventual access to the target datasets and/or datastores.
9. The master key (secret) is deleted from the environment (once the App A has consumed it)
10. SSH public key is deleted and subsequently the deployment user (Agent) logs out/disconnect over SSH Feature Block 4: Instance Shutdown As part of instance being terminated there is no clean up required (i.e., master key will also be deleted as part of the instance and corresponding App A being shutdown)

The feature blocks of FIG. 3B are described as follows with regards to an API-based trust model establishment and application provisioning in the cloud. In accordance with the exemplary embodiments of the invention as illustrated in FIG. 3C there is at:

Feature Block 1: Instance/Image Template:
SSL client public key or API signing keys are preconfigured in the instance image to establish trust by the Deployment user (Agent) with the instance
Feature Block 2: Instance Start-Up (e.g. Bootstrapping)
Instance is started and the App A is started
App A has specific API end-point, which is initialized (i.e., it is in listening mode)
Feature Block 3: Instance Operation
API call invoked via API signing keys and server SSL or mutual SSL authentication using both server and client certificates.
SSL client certificate/public key or API signing keys must be removed from the instance once the injection of the master key is completed via the API call completion
Feature Block 4: Instance Shutdown
As part of instance being terminated there is no clean up required (i.e., master key will also be deleted as part of the instance and corresponding App A being shutdown)

Figure 4:
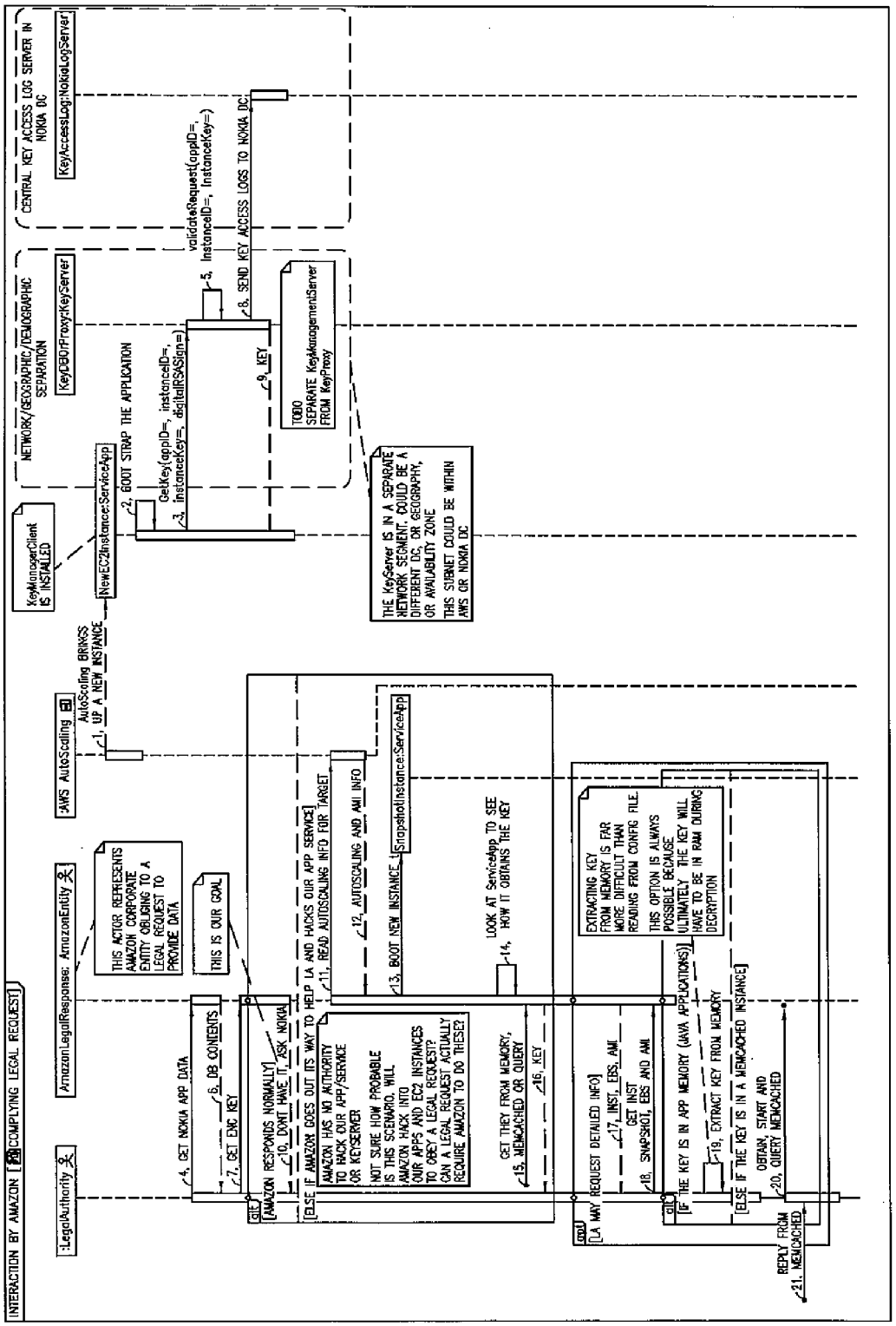
FIGS. 4, 5, 6, and 7 each illustrate aspects of internal security issues addressed using the exemplary embodiments of the invention.
Figure 5:
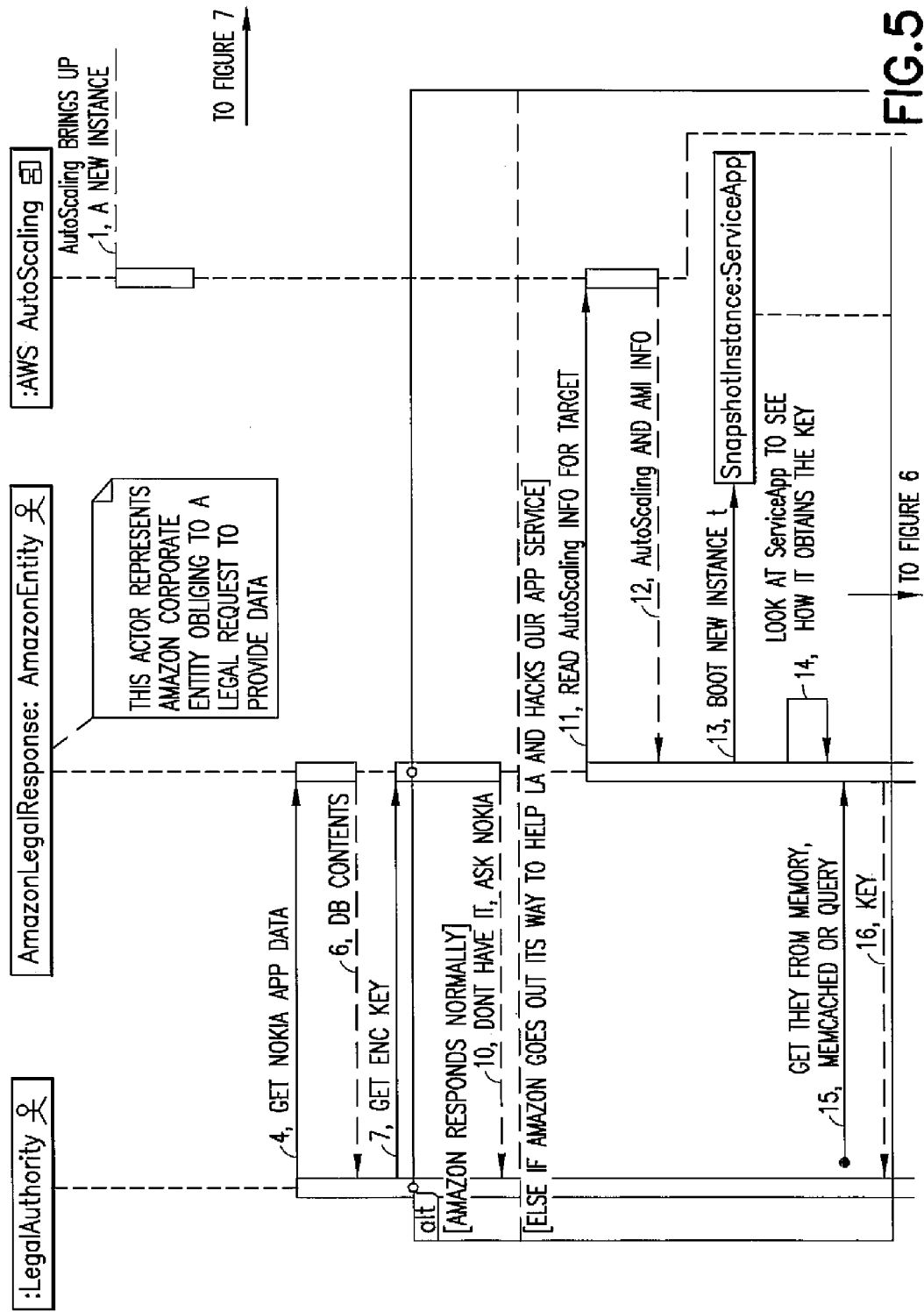
Figure 6:
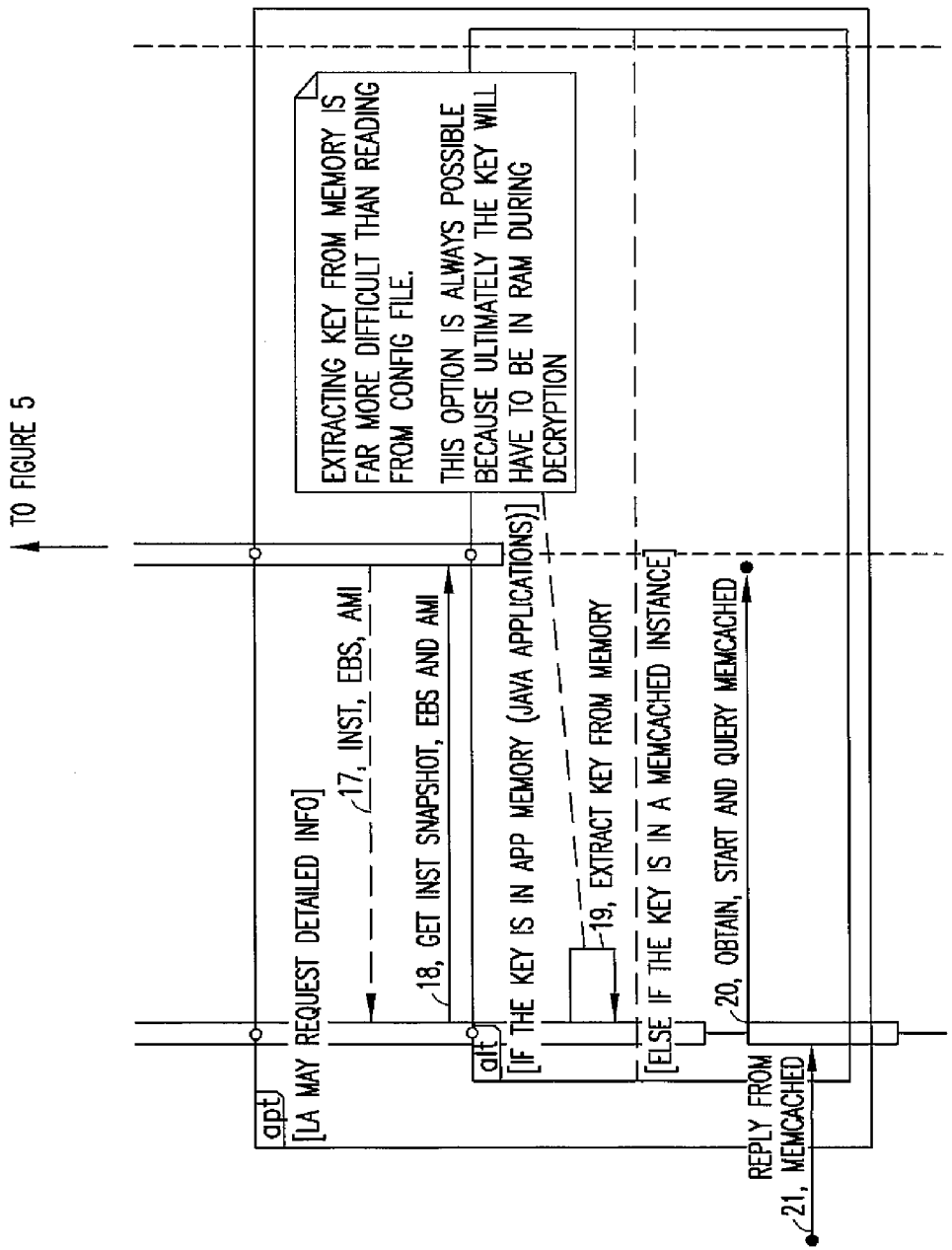
Figure 7:
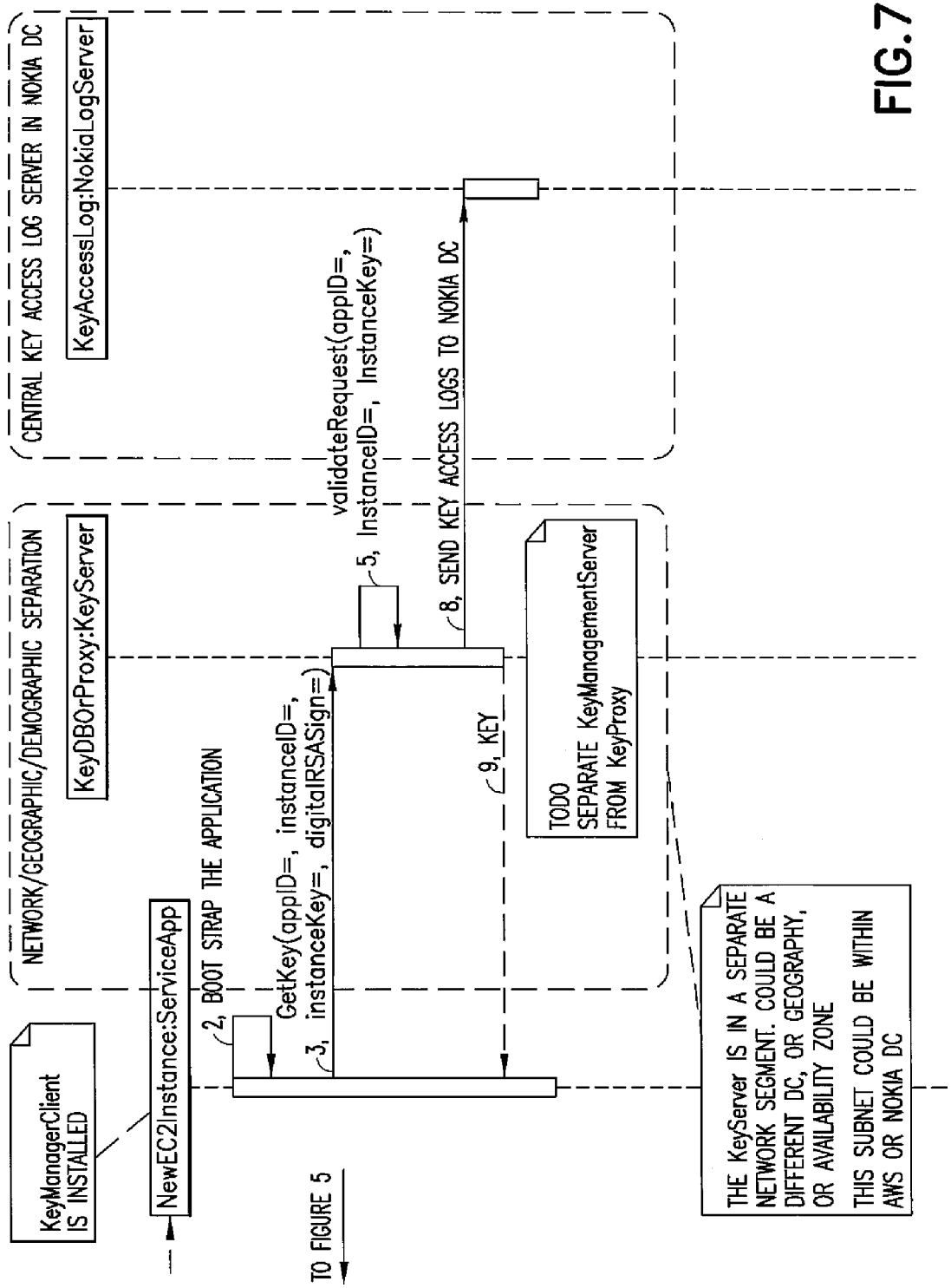

FIGS. 4, 5, 6, and 7 illustrate for AWS as a non-limiting example a production misuse/internal security map. In FIG. 4 there is illustrated a complete picture describing interactions between a cloud application provider and a legal authority, in this case the provider is referred to as Amazon®. FIGS. 5, 6, and 7 zoom in on various areas of the map as well as comments regarding issues associated with this interaction which the exemplary embodiments of the invention can address.

Figure 8:
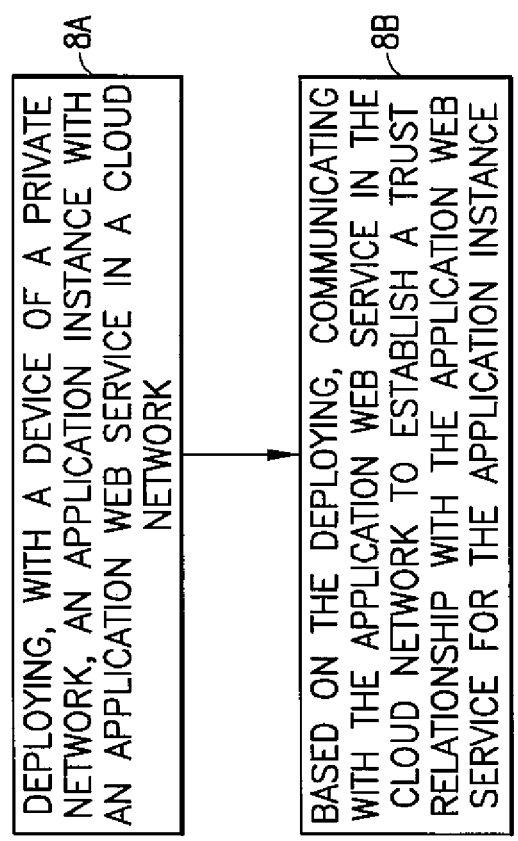
FIG. 8 is a logic flow diagram that illustrates the operation of a method and a result of execution of computer program instructions embodied on a computer readable medium, in accordance with exemplary embodiments of this invention.

FIG. 8 illustrates a logic flow diagram of a non-limiting operation of a method, and a result of execution of computer program instructions, in accordance with exemplary embodiments of this invention. As illustrated in step 8A there is deploying, with a device of a private network, an application instance with an application web service in a cloud network; and as illustrated in step 8B of FIG. 8 there is, based on the deploying, communicating with the application web service in the cloud network to establish a trust relationship with the application web service for the application instance.

In accordance with the exemplary embodiments of the invention as described in the paragraph above, the deployment script is defined in a machine image for the application instance.

In accordance with the exemplary embodiments of the invention as described in the paragraphs above, the machine image when started passes at least one of a username and password, or a security key to the application instance.

In accordance with the exemplary embodiments of the invention as described in the paragraphs above, the communicating comprises: connecting to the application image using the security key passed to the application instance; deploying a child certificate into the application image for the trusted relationship.

In accordance with the exemplary embodiments of the invention as described in the paragraphs above, there is after the connecting, assigning secrets read from environmental variables to the application instance for the trusted relationship, wherein the environmental variables are from a location controlled by the private network.

In accordance with the exemplary embodiments of the invention as described in the paragraphs above, the machine image, when started for the application instance, loads a deployment agent to connect back to the private network.

In accordance with the exemplary embodiments of the invention as described in the paragraphs above, a validation of the connection back is performed based at least one of a username and password, or the security passed to the application instance.

In accordance with the exemplary embodiments of the invention as described in the paragraphs above, based on the validating, a child certificate and corresponding configuration information is assigned to the application instance.

In accordance with the exemplary embodiments of the invention as described in the paragraphs above, the deployment script comprises an auto scaling rule.

In accordance with the exemplary embodiments of the invention there is An apparatus comprising: means for deploying, with a device of a private network, an application instance with an application web service in a cloud network; and means, based on the deploying, for communicating with the application web service in the cloud network to establish a trust relationship with the application web service for the application instance.

In accordance with the exemplary embodiments of the invention as described in the paragraph above, the means for communicating and deploying comprises an interface to a communication network, and a computer readable memory embodying computer program code, the computer program code executed by at least one processor.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   deploying, with a device of a private network, an application instance to a public cloud with an application web service in a cloud network, wherein the deploying is using a deployment script defined in a machine image of the device for the application instance, and wherein the machine image when started causes application credentials to be passed to the application instance; and
   using at least the application credentials, communicating with the application web service in the cloud network to establish a trust relationship with the application web service for the application instance.

2. The method according to claim 1, wherein the application credentials are passed to the application instance by a third party provider separate from the cloud network.

3. The method according to claim 2, wherein the application credentials passed to the application instance comprises at least one of a username and password, and a security key.

4. The method according to claim 1, comprising:
   connecting to the application instance using the application credentials passed to the application instance; and
   deploying a child certificate into the application image for the trust relationship.

5. The method according to claim 4, comprising:
   after the connecting, assigning secrets read from environmental variables to the application instance for the trust relationship, wherein the environmental variables are from a location controlled by the private network.

6. The method according to claim 1, wherein the machine image, when started for the application instance, loads a deployment agent to connect back to the private network.

7. The method according to claim 6, wherein a validation of the connection back is performed based on the application credentials passed to the application instance.

8. The method according to claim 7, comprising based on the validating, a child certificate and corresponding configuration information is assigned to the application instance.

9. The method according to claim 1, wherein the deployment script comprises an auto scaling rule.

10. A non-transitory computer readable medium embodying computer program code, the computer program code executable by at least one hardware processor to perform the method according to claim 1.

11. An apparatus comprising:
    at least one hardware processor; and
    at least one memory including computer program code, where the at least one memory and the computer program code are configured, with the at least one hardware processor, to cause the apparatus to at least:
    deploy, with a device of a private network, an application instance to a public cloud with an application web service in a cloud network, wherein the deploying is using a deployment script defined in a machine image of the device for the application instance, and wherein the machine image when started causes application credentials to be passed to the application instance; and
    using at least the application credentials, communicate with the application web service in the cloud network to establish a trust relationship with the application web service for the application instance.

12. The apparatus according to claim 11, wherein the script application credentials are passed to the application instance by a third party provider separate from the cloud network.

13. The apparatus according to claim 11, wherein the application credentials passed to the application instance comprises at least one of a username and password, and a security key.

14. The apparatus according to claim 11, wherein the at least one memory including the computer program code is configured with the at least one hardware processor to cause the apparatus to:
    connect to the application instance using the security key passed to the application instance; and
    deploy a child certificate into the application image for the trust relationship.

15. The apparatus according to claim 14, wherein the at least one memory including the computer program code is configured with the at least one hardware processor to cause the apparatus to:
    after the connecting, assign secrets read from environmental variables to the application instance for the trust relationship, wherein the environmental variables are from a location controlled by the private network.

16. The apparatus according to claim 11, wherein the machine image, when started for the application instance, loads a deployment agent to connect back to the private network.

17. The apparatus according to claim 16, wherein a validation of the connection back is performed based on the application credentials passed to the application instance.

18. The apparatus according to claim 17, wherein the at least one memory including the computer program code is configured with the at least one hardware processor to cause the apparatus to:
    based on the validating, assign a child certificate and corresponding configuration information to the application instance.

19. The apparatus according to claim 11, wherein the deployment script comprises an auto scaling rule.

* * * * *